March 14, 1944.  G. H. PERRY  2,343,996
PNEUMATIC CUSHION
Filed May 16, 1941   3 Sheets-Sheet 1

INVENTOR.
GEORGE H. PERRY
BY Van Deventer & Grier
ATTORNEYS

March 14, 1944. G. H. PERRY 2,343,996
PNEUMATIC CUSHION
Filed May 16, 1941 3 Sheets-Sheet 2
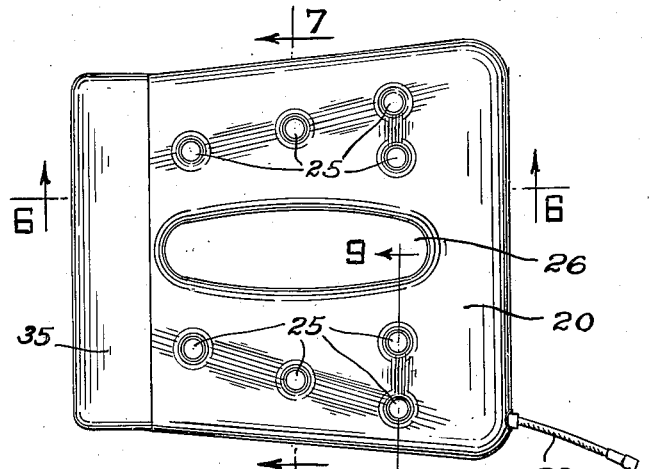
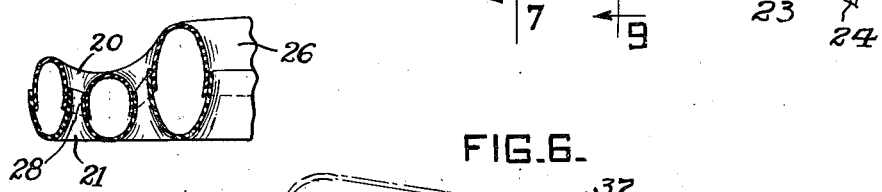
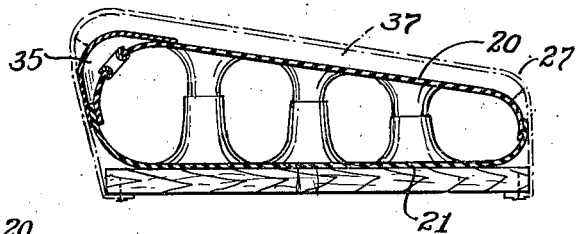
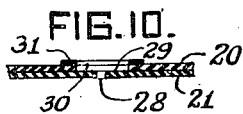
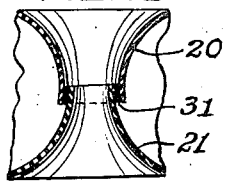
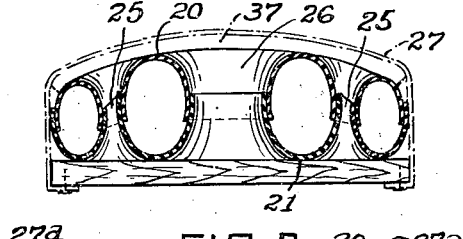
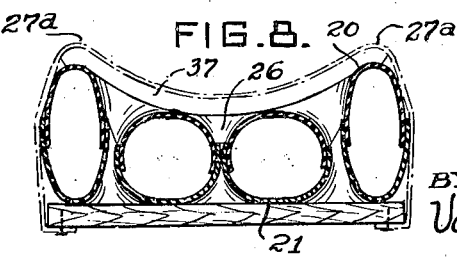
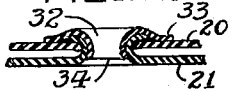
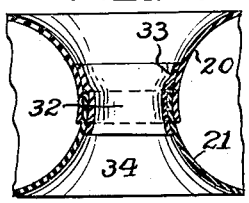
INVENTOR.
GEORGE H. PERRY
BY
Van Deventer + Grier
ATTORNEYS.

March 14, 1944.  G. H. PERRY  2,343,996
PNEUMATIC CUSHION
Filed May 16, 1941  3 Sheets-Sheet 3
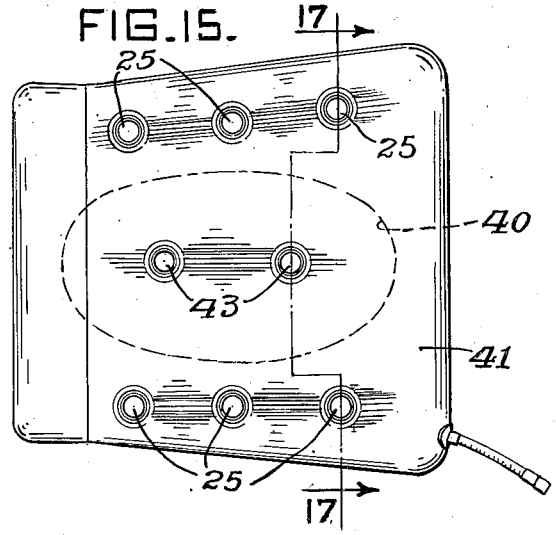
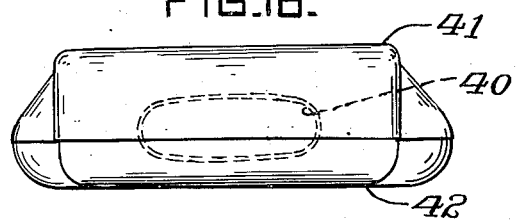
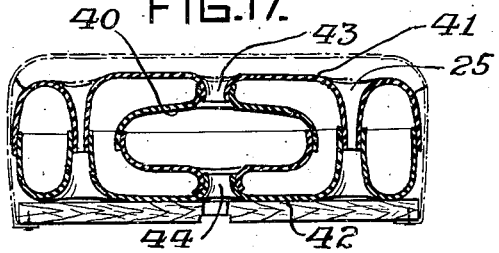
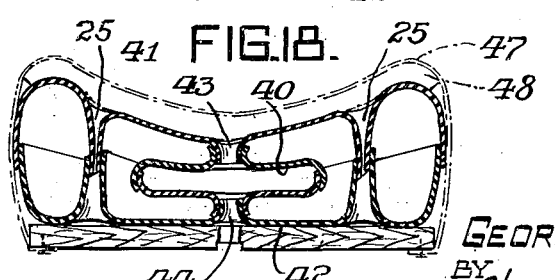
INVENTOR.
GEORGE H. PERRY
BY Van Deventer & Greer
ATTORNEYS.

Patented Mar. 14, 1944

2,343,996

UNITED STATES PATENT OFFICE 2,343,996

PNEUMATIC CUSHION

George H. Perry, Brooklyn, N. Y., assignor to Airtress Corporation of America, a corporation of New York Application May 16, 1941, Serial No. 393,759

3 Claims. (Cl. 155—179)

This invention relates to improvements in pneumatic cushions and pads and is directed more particularly to cushions and pads for use in motor vehicles such as, for example, automobiles, trucks, tanks, motor boats and airplanes.

The principal object of the invention is the provision of a pneumatic cushion including inherent means for absorbing the shocks and vibrations incident to motor-vehicle travel, and for minimizing "snubbing" when sudden shocks are encountered.

A further object of the invention is the provision of a pneumatic cushion the inherent construction of which imparts to said cushion a degree of stability, not found in such devices of the prior art, and yet maintaining a degree of equilibrium which imparts to said cushion greater flexibility than is present in said devices of the prior art.

Another object of the invention is the provision of a pneumatic cushion in which the ventilation and the form fitting power are greatly improved, and in which pressure on the perineum and rectal regions of the rider is eliminated.

Another object of the invention is the provision of an air inflated cushion including in the unitary structure thereof means permitting the further expansion of its confined air and the consequent relief of the pressure thereof when the latter reaches a degree which might otherwise cause undesirable rigidity and discomfort.

Yet another object of the invention is the provision of a cushion of the inflatable type in which at least a portion of the air confining walls are distensible within and free of restriction by a normally tight fitting, non-elastic cover enveloping said cushion.

Still another object of the invention is the provision in a pneumatic cushion of an elongated opening therethrough which forms a zone, the walls of which may approach each other when the internal pressure of the cushion is increased by the imposition of weight thereon.

A further object of the invention is the provision of a pneumatic cushion, the structure of which inherently combines the comfort of a relatively high, soft, easily depressed midportion with the stability of a relatively lower and firmer surrounding area.

Another object of the invention is the provision of an air inflated cushion having one or more cells communicating with the atmosphere and located within the confines of the inflated body of the cushion, or defined by the walls of said body, said last walls being vertically compressible under weight, and at the same time laterally collapsible toward each other or upon themselves when the air pressure within the inflated body exceeds a predetermined pressure.

In the accompanying drawings, which by way of example illustrate one form of my new and improved pneumatic cushion and several structural modifications thereof—

Figure 5 is a view of the cushion shown in Figure 1 after the same has been inflated;

Figure 6 is a sectional elevation of the inflated cushion as seen along the lines 6—6 of Figure 5;

Figure 7 is a sectional elevation of the inflated cushion as viewed along the lines 7—7 of Figure 5;

Figure 8 is a sectional elevation, similar to Figure 7 except that it shows the form the cushion takes when subjected to the weight of an average rider;

Figure 9 is a sectional elevation as seen along the lines 9—9 of Figure 5;

Figures 10 and 11 show the steps taken in forming my new and improved tufts in very thin rubber, an extra ring of material being provided to reinforce said tufts;

Figure 12 is a sectional elevation representing the tufts shown in Figure 11 after the same has been inflated;

Figure 13 is a sectional elevation showing a tuft formed by my new and improved method and provided with a reinforcing grommet;

Figure 14 is a sectional elevation representing the tuft shown in Figure 13 after the same has been inflated;

Figure 15 is a plan view of an inflated cushion in which the expansion cell is completely surrounded by the outer walls of the cushion;

Figure 16 is an elevation of the cushion shown in Figure 15, looking at the left end thereof;

Figure 17 is a sectional elevation taken along the lines 17—17 of Figure 15; and Figure 18 is a sectional view, similar to Figure 17, showing the shape of the cushion when subjected to the weight of a passenger.

Figure 1:
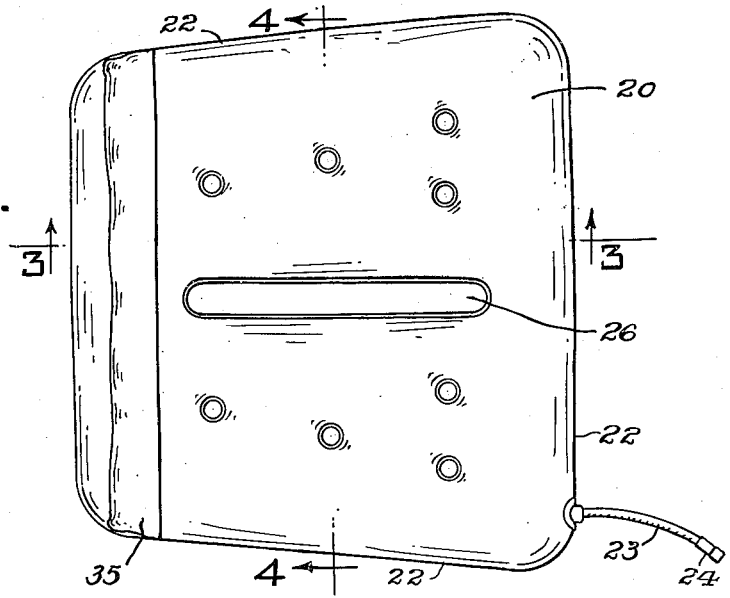
Figure 1 is a view of the cushion as seen from above before the same is inflated.

The type of cushion herein chiefly concerned is that which has a main, weight-sustaining body in the form of an elastic-walled air inflated bag, usually made of rubber and hereinafter referred to as the "air bag." This type of cushion in its combination of the elastic properties of rubber and air, has a high theoretical comfort and efficiency in the absorption of the shocks and vibrations incident to motor-vehicle travel.

In practice, however, this theoretical efficiency has heretofore been greatly reduced by the fact that motor-vehicle cushions are customarily covered with some non-elastic material, such as leather or heavy fabric, which for good appearance must fit snugly over the air inflated body. This non-elastic covering tends to nullify the elastic value of the air confining walls of the air bag by restricting their distention to a very definite limit. At this limit, the internal pressure of the confined air may be said to be normal. When this normal pressure is sharply increased, as when the rider seats himself heavily or is subjected to a severe jounce, the confined air, finding no relief by the distention of its confining walls, tends to reach a compression that gives rigidity to the cushion and an abrupt snubbing to the rider. For the same reason, the confined air in an airplane cushion, increasing its effective pressure as the atmospheric pressure diminishes at increasing altitudes, is apt to make the cushion too hard for comfort.

Such disadvantages are accentuated because of the fact that most motor vehicle cushions are small in size and therefore do not contain sufficient air to overcome the rigidity caused by abnormal compression. An improvement would be to increase the volumetric capacity of the air bag by increasing its vertical depth, but heretofore this was found to be generally impracticable because of (1) the concurrent loss of stability at normal compression and (2) the increased tendency to "roll."

My hereinafter described invention eliminates all of the above-mentioned disadvantages by permitting the distention of the air-confining walls within the confines of the non-elastic cover, and by furnishing additional scope for the confined air within the body of the air inflated bag itself. Greater vertical depth and added volumetric capacity is incorporated in the air bag by means which also add to the stability and riding comfort of the cushion.

Referring to the drawings, and more specifically to Figures 1 to 4, inclusive, which illustrate an embodiment of my new and improved cushion, said cushion is shown in a deflated state. Of course the cushion is formed of uncured rubber which is afterwards vulcanized in its construction stage; the bag mainly consists of an upper sheet 20 of uncured rubber, and a lower sheet 21 of uncured rubber. These sheets are lapped or bound together along their marginal edges, as shown at 22. A tubular body 23 is secured thereto and communicates with the interior of the bag. At the outer end 24 of the tubular member is a valve through which the bag may be inflated or deflated.

At predetermined points 25, along lines roughly paralleling the edge of the cushion, but spaced apart therefrom, the upper sheet 20 and the lower sheet 21 are secured together against relative separating movement. These points 25 preferably outside of the area that would normally be contacted by the rider and vary in number and position in accordance with the conditions for which it is to be used.

The upper and lower sheets are usually secured together by direct contact with each other; however, in cushions of very small size and in which the separation between the upper and lower sheets is slight, short tubular stays may be used to secure these sheets together. The actual method of making the fastenings between the sheets is the subject of co-pending application Serial No. 391,697, filed May 3, 1941.

In the preferred form of the invention, the points at which the upper and lower sheets of material are secured together are in the form of conoidal apertures extending through the bag. These offer advantages which will hereinafter be described.

Figure 2:
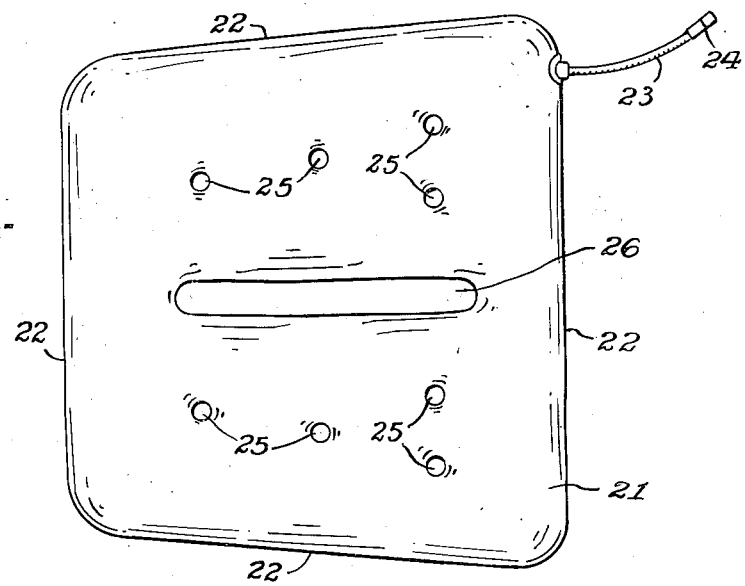
Figure 2 is a view of the cushion taken from the opposite side of that shown in Figure 1.
Figure 3:
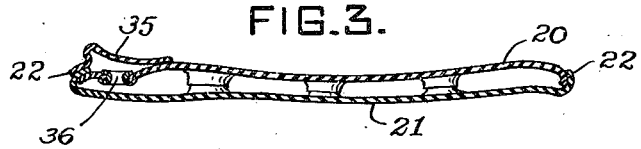
Figure 3 is a sectional elevation of the deflated cushion as seen along the lines 3—3 of Figure 1.
Figure 4:
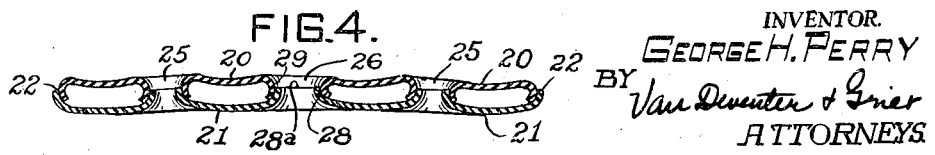
Figure 4 is a sectional elevation of the deflated cushion as seen along the lines 4—4 of Figure 1.

The central portion of the air bag has formed therein what might be termed an equalizer aperture. This aperture is designated generally by the numeral 26 and in its preferred form, as shown in Figures 1, 2 and 4, it consists of an elongated aperture or opening formed in the body of the cushion, said aperture being open to the atmosphere at both ends. The walls of this aperture form a portion of the air-confining walls of the body and connect the upper and lower walls together, yet permitting the walls 20 and 21 to have a considerable degree of separation when the bag is inflated. The height of the inflated air bag is thus made substantially greater in the vicinity of its midportion than at its side edges.

The walls of the aperture 26 may in practice be made of rubber of somewhat heavier gauge and of a stiffer composition than the main walls of the air bag, but this is not essential to the invention; in fact in the embodiment illustrated the walls of the aperture 26 are formed of the same material as that of the upper and lower sheets 20 and 21.

In the form shown in the drawings, the aperture 26, as seen in Figures 1 and 2, is of an elongated oval cross section, which is preferable for the following reasons: (a) It makes the cushion form fitting when the same is inflated; (b) The weight of the rider is supported without pressure against the perineum and rectal region, which is often of high importance to the rider's comfort and well being; and (c) The aperture 26 forms an equalizer for external pressures which may be applied to the cushion in use, as will presently be described.

Although an aperture of the elongated oval cross section is preferable, the shape may be varied in wide limits without departing from the spirit of the invention. For example, it may be circular, comprised of a plurality of circular zones closely associated; it may be square, triangular or polygonal cross section.

In the embodiment of the invention shown, the height of the aperture 26, when the bag is inflated, is greater at the front of the cushion than it is at the rear, thereby permitting a greater separation of the walls 20 and 21 at the front of the bag than at the rear. This produces the generally preferred backward slope of the cushion's upper surface. After forming the bag, the uncured rubber is vulcanized in the usual manner.

The walls of the aperture 26, although they form a tubular stay controlling the relative separation of the walls 20 and 21 of the bag in its midportion, its most essential function is to form an expansion area which in effect increases the volumetric capacity of the air bag, and hence it in effect effects release of compression in the bag due to the fact that its walls collapse inwardly upon themselves, as shown in Figure 8, when the internal pressure of the bag increases above its normal pressure.

In other words, as the external weight is applied to the bag, the pressure within the bag tends to increase, and since the bag is confined by the fabric or non-elastic envelope 27, the walls of the aperture 26 move toward each other, and in extreme cases may actually contact each other for a substantial distance within the confines of said aperture.

This expansion aperture is preferably given a substantial cross section area in proportion to the size of the air bag. In practice it is never less than ten percent nor greater than twenty percent of the entire cross section of the main air bag.

Bearing in mind that the non-elastic or fabric casing 27, above referred to, holds the distention of the air bag to a definite limit and that such distention up to that limit will draw the walls of the aperture 26 vertically taut with a tendency against their inward collapse, it will be clear that an increase of internal pressure beyond that point is unable to produce further outward distention and and will, therefore, find relief by pressing the elastic walls of the aperture inwardly toward or upon themselves, as indicated in Figure 8. Premature action prior to an increase of pressure is avoided by the vertical tautness of the walls defining said aperture, an in cases where the last-mentioned walls are somewhat heavier in gauge and stiffness, as above mentioned, these walls by their increased stiffness further avoid the premature action referred to.

When the increase of pressure is caused (as is usually the case) by the weight or jouncing of the rider, the action of the expansion aperture is aided and to a great extent regulated by its vertical compression under the imposed weight. Any slack thus given the walls of the cell by this vertical compression is immediately taken up by the internal pressure which collapses the aperture, relieves the compression and thereby avoids sudden snubbing. The action of the expansion aperture is, therefore, to a substantial degree, proportioned to the weight of the rider and the severity of the jounce. This produces a cushion which is inherently self-regulating, both as to the weight of the rider and the varying conditions of the road.

By giving the midportion of weight-bearing center of the cushion greater height, my new method of construction gives added volumetric capacity to the cushion and the increased volume of the confined air not only reduces the danger of abrupt snubbing through the quick compression of a smaller volume of air, but also gives added softness and comfort to the rider. The tendency to "rolling," heretofore inseparable from cushions of large air volume, is, according to this invention, avoided by the firmer area controlled by the points 25. The depression of the high central area, through the flattening of its upward curve when the weight is imposed (as shown in Figure 8) gives some slack to the non-elastic casing 27 toward the edges of the cushion, thus permitting a slight distention of the edge areas, as shown at 27a in Figure 8. This forms a firmly expanded and firmly controlled rim or zone surrounding the seating area and aids in nullifying tendencies to "roll."

As shown in the drawings, the elongated aperture 26 is formed as follows: An elongated hole 28 is formed in the lower sheet 21, and a second elongated hole 29 is formed in the upper sheet 20, the hole 29 being slightly larger than the hole 28. The edges 28a with both the sheets 20 and 21 together and the holes in axial alignment, are pulled through the hole 29 and secured to the upper sheet around the outline of the hole 29.

In cushions constructed in this manner, the high center is produced under inflation by such separation of the upper and lower walls of the cushion, and its height is influenced by the distance between the edges of the cell 26 and the connected points 25.

Although this is a preferred form of construction, I do not wish to be limited to this form as the cell could be made up in other ways, for example by positioning an insert between the sheets and securing said insert to both sheets.

Where the sheets 20 and 21 are made of thin material the aperture 26 may be constructed as shown in Figures 10 and 11. The lower sheet 21 may have a narrow slot 28 formed therein, and the upper sheet 20 may have a wider slot 29 formed therein. Matching the slot 29 is an opening 30 in a reinforcing member 31 which is adhered to the upper sheet. The material of the lower sheet about the slot 28 is pulled upwardly through the slot 29 and folded over and adhered to the reinforcing member 31, as shown in Figure 11, after which the materials are vulcanized. When inflated, this arrangement takes a form approximating the showing in Figure 12.

A further modified construction contemplates the arrangement shown in Figures 13 and 14, in which the edges of the slot in sheet 21 are pulled through the slot in the sheet 20 and adhered thereto. Superimposed on the joint so formed is an elongated grommet member 32, the upper lips 33 of which are adhered to said joint and also to the surface of sheet 20 around said joint. The other lips 34 of grommet member 32 are adhered to the lower sheet 21 and overlie the junction of sheets 20 and 21. When inflated after vulcanizing, as shown in Figure 14, it can be seen that the joint between sheets 20 and 21 are thoroughly reinforced.

An extra strip of rubber 35 is positioned on the cushion across the front edge, and is adhered to the bag before the same is vulcanized. This strip 35 forms an auxiliary air chamber or nose tube.

An opening 36 formed in the wall 20 beneath the strip 35 places the interior of the auxiliary chamber into communication with the interior of the bag proper, so that when the bag is inflated, the auxiliary chamber will also be inflated by air passing through the opening 36.

When the cushion is inflated, this auxiliary chamber forms a firm "roll" across the front, as shown in Figure 6, and serves to more firmly "anchor" the rider to the cushion, as it prevents forward motion of the rider when rapid deceleration of the vehicle takes place.

In the modification shown in Figures 15 to 18, inclusive, a cell 40 is positioned within the body of the cushion between the upper wall 41 and the bottom wall 42, and preferably extends from the front to the back of the cushion. The upper and lower walls 41 and 42 are secured together against relative separating movement at points 25 in any desired manner, for example as shown in the other figures of the drawings.

The upper wall of the cell 40 is secured to the upper wall 41 of the cushion at points 43, and the lower wall of the cell is secured to the lower wall 42 of the cushion at points 44, and these points may communicate with the atmosphere.

The cushion, as shown in Figure 18, with the cell 40 partly collapsed, is provided with padding 48 which is covered with fabric or upholstery 47 which substantially define the outward expansion of the cushion in all directions.

The cell 40 is preferably formed of material of sufficient stiffness to resist collapse, under the normal pressure of the confined air within the bag at sea level, or where the atmospheric pressure is approximately 14.7 pounds to the square inch, and adapted to yield gradually as the amospheric pressure decreases due to height to which the plane, in which said cushion is installed, rises.

I have found that a preferable size of the cell 40 is approximately one-third that of the volumetric capacity of the cushion. Full collapse of the cell 40 adds to the volumetric capacity of the air bag portion of the cushion sufficient to balance the effect of altitudes ordinarily reached by passenger-carrying airplanes.

Since the walls of the cell 40 can move toward each other as the atmospheric pressure is reduced, the interior pressure of the cushion is maintained approximately uniform. In the same manner, changes in temperature sufficient to cause changes in the internal pressure are taken care of.

Although a simple embodiment of the invention and several modifications thereof have been herein shown and described, it is obvious that many changes may be made in the arrangement herein shown and described without departing from the spirit of the invention as set forth in the annexed claims.

What is claimed is:

1. In a pneumatic cushion for vehicles, a main inflatable body formed of rubber or other elastic material, a longitudinal expansion aperture formed in and extending through said body, said aperture having walls extending from the upper and lower surfaces of said body and joined in overlapping relation along a mid-line therein, thereby eliminating the use of extra reinforcing members, a plurality of circular apertures smaller than and disposed about said longitudinal aperture, said circular apertures also being formed in and extending through said body and including walls extending from the upper and lower surfaces of said body joined in overlapping relation along mid-lines therein, said longitudinal and circular apertures forming a relatively high zone in the mid-portion of said cushion and an area thereabout relatively lower in height, and an enveloping casing of substantially non-elastic material snugly embracing said body when the latter is normally inflated.

2. A pneumatic cushion according to claim 1 in which said apertures are generally of an hourglass cross-section with said overlapping portions substantially midway the sections when said cushion is inflated.

3. In a pneumatic cushion for vehicles or the like, an inflatable air bag formed of rubber or other elastic material, a longitudinal aperture extending from a point adjacent to the front to a point adjacent to the rear of said cushion along a mid-line therein, said aperture having walls co-extensive with the top to the bottom walls of said cushion and joined in overlapping relation along a line substantially midway between the top and the bottom of said cushion, a plurality of circular apertures smaller in extent than and disposed about said longitudinal aperture, said circular apertures also being coextensive with said top and bottom walls and joined in overlapping relation along lines substantially midway between the top and bottom surfaces of said cushion, an auxiliary air chamber disposed along the upper front edge of said cushion and having its walls merging with the upper surface of said cushion, thereby forming a roll the surface of which is substantially above the main surface of the cushion when the latter is inflated, and means placing said auxiliary air chamber in communication with the interior of said air bag, whereby both said bag and said chamber may be inflated to substantially the same internal pressure, the walls of said longitudinal aperture being adapted to collapse toward each other when stresses tending to change said internal pressure are subjected to either said bag, said auxiliary chamber, or both, said auxiliary chamber being adapted to facilitate the holding of a rider in such a position of said cushion that his perineal region is positioned above said aperture.

GEORGE H. PERRY.